United States Patent [19]

Kehren et al.

[11] 4,088,518
[45] May 9, 1978

[54] HEAT-STABLE MOLDED COMPOSITE EXPLOSIVES AND PRODUCTION

[75] Inventors: Jean-Paul Andre Kehren; Robert Andre Ousset, both of Sorgues, France

[73] Assignee: Societe Nationale des Poudres et Explosifs, France

[21] Appl. No.: 706,628

[22] Filed: Jul. 19, 1976

[30] Foreign Application Priority Data

Jul. 30, 1975 France .................................. 75 23735

[51] Int. Cl.$^2$ ............................................. C06B 45/22
[52] U.S. Cl. ...................................... 149/11; 149/19.2; 149/92; 149/93; 264/3 C
[58] Field of Search ..................... 149/11, 92, 93, 19.2; 264/3 R, 3 C

[56] References Cited

U.S. PATENT DOCUMENTS 3,767,488  10/1973  Seals ................................. 149/11 X
3,773,572  11/1973  Thomas ................................. 149/11
3,984,264  10/1976  Lampert ............................ 149/11 X Primary Examiner—Stephen J. Lechert, Jr.
Attorney, Agent, or Firm—Bucknam and Archer

[57] ABSTRACT

The specification describes heat-stable pressure-moulded composite explosives which comprise at least one crystalline explosive having a high rate of detonation and, as a synthetic binder therefor, a cross-linked silicone resin. These composite explosives are produced by coating the crystalline explosive in the presence of water with a thermosetting polysiloxane prepolymer, then drying and cross-linking the moulding powder obtained, and finally cold-compressing the cross-linked moulding powder to form a shaped composite explosive.

These explosives have exceptional mechanical strength at elevated temperatures which enables them to be used in all types of explosive charge. The process used provides increased safety and results in a lower cost price.

20 Claims, No Drawings

HEAT-STABLE MOLDED COMPOSITE EXPLOSIVES AND PRODUCTION

The present invention relates to novel heat-stable moulded composite explosives and to a process for their production manufacture.

The manufacture of composite explosives having a high content of high explosive has been solved long ago in various ways. It is known, for example, to incorporate a high explosive of high melting point into a molten mass of an explosive of low melting point and to mould the resulting pasty mass by casting. French Patent Application No. 72/05,726 describes a composite explosive made by this process. The explosive of low melting point can also be replaced by a synthetic material which has not yet been crosslinked and which is cured by means of curing agents and catalysts. French Pat. No. 2,225,979 and German Pat. No. 1,172,590 describe such a process.

Instead of using a casting method, it has also been proposed to mould a mixture of high explosive and a synthetic binder (wax or resin) under high pressure. Such processes, and the products which were obtained are extensively described in, for example, French Pat. No. 2,119,127 and 2,135,534 and U.S. Pat. 3,173,817.

The synthetic binders which are usually employed in the latter process are, for example, polyurethanes, halogenated polyalkylenes, polyacrylamides and silicones. In all the processes employing compression, it is essential that the binder should be least mouldable so that, after coating the explosive particles by contacting the latter with an aqueous dispersion of the binder, it is possible to impart to the composite explosive the desired shape and density by heat softening and hot compression of the mixture under conditions of good reproducibility and safety. It is for this reason that all the binders used hitherto are thermoplastics.

However, this type of process and this type of binder have disadvantages which it has hiterto been necessary to tolerate. Firstly, it is in principle undesirable to have to compress under high pressure, compositions having a low content of binder and a very high content of very powerful high explosives, such as hexogen or octogen, and this is all the more so when compression is carried out hot, generally at from 70° to 110° C, using presses which are expensive because they are equipped with heating devices.

Secondly, the compression-moulded shapes obtained have a low mechanical strength when the temperature of use becomes slightly elevated because of the thermoplasticity of the binder.

It has recently been proposed, in French Pat. Nos. 2,241,514 and 2,268,770, to prepare a moulding powder consisting of explosive granules coated with a non-crosslinked binder, then to compress the moulding powder, and finally to crosslink the compression-moulded shapes thus obtained. This process is not very satisfactory because it requires either the incorporation of a moderator which results in a reduction in the intrinsic power, or the use of a solution of the binder in an organic solvent which is inflammable or toxic. Furthermore, this process gives non-crosslinked moulding powders which are, therefore, insufficiently stabilised and cannot be stored so that they can be used after a long period. Furthermore, the fact that crosslinking takes place after compression virtually excludes the use of polycondensable resins and makes it necessary to effect cross-linking in ovens which have the capacity to accommodate a product which has already been moulded and which is, therefore, bulky and which is also highly compressed and therefore more explosive than the moulding powder.

We have now developed a process for manufacturing composite explosives which have a high content of high explosive and exceptional mechanical strength at high temperatures.

According to the present invention, there is provided a process for the production of a heat-stable composite explosive, which comprises
(i) coating one or more crystalline explosives having a high rate of detonation, in the presence of water, with a mixture of a prepolymer of a thermosetting silicone resin and a cross-linking catalyst therefor,
(ii) drying and cross-linking the moulding powder obtained, and
(iii) compressing the cross-linked moulding powder in the cold to form a shaped composite explosive.

The present invention also comprises a heat-stable pressure-moulded composite explosive which comprises one or more crystalline explosives having a high rate of detonation and, as a synthetic binder therefor, a cross-linked silicone resin.

The explosives according to the invention preferably contain up to 98% of one or more high explosives and at least 2% of the thermosetting cross-linked silicone binder.

The main advantages of the process according to the invention are that (a) it can be carried out with low cost apparatus and (b) that it is carried out under safer conditions than the prior processes referred to above because the coating step is carried out under water, which is an operation which offers a good guarantee of safety and, in addition, the compression moulding step is carried out cold.

The composite explosive according to the invention has an explosive performance similar to that of the corresponding pure explosive and has exceptional mechanical properties at high temperatures.

Other advantages resulting from the use of the process according to the invention, or inherent in the composite explosives according to the invention, will emerge from the detailed description which will follow, in which the expressions "high explosive" or "explosive having a high rate of detonation" will be used synonomously.

The coating stage of the process according to the invention is, in principle, conventional. On the other hand, it differs radically from the prior art processes in that in place of a thermoplastic resin, a thermosetting silicone resin is used. For example, a stirred dispersion in water of crystals of high explosive to which one or more modifiers intended to influence the physical or chemical properties of the composite explosive may, if desired, be added, is formed. This dispersion, which preferably contains one part by weight of explosive per two to three parts by weight of water is then heated to a temperature of about 75° C and a solution of a prepolymer of the silicone resin, to which a cross-linking catalyst has been added, in an inert organic solvent for the prepolymer, is added. After removing the organic solvent, for example by distillation under reduced pressure, the coated suspension is cooled and filtered, and the product is suction-drained. Coating can also be carried out without using a solvent for the prepolymer.

After the coating stage, the coated granules are dried and cross-linked. The drying temperature depends on the cross-linking conditions appropriate to the resin and the amount of catalyst used, but in general a temperature of about 70° C gives good results within a period of time compatible with mass production. During drying, cross-linking is generally substantially completed because of the favourable influence of the temperature. To complete cross-linking, it is advantageous when using certain resins with a high content of explosive and/or with a low content of catalyst, to further heat the material at a higher temperature, for example of about 130° C.

The moulding powder obtained is then placed in an ordinary explosives press or a pelletiser, because it is not necessary for the press or pelletiser to be equipped with a system for heating the powder which is to be compressed. It is generally necessary to use a pressure of at least 1,000 bars and, preferably, from 2,500 to 4,000 bars. The compression temperature is conveniently ambient temperature, but can, of course, be other than ambient temperature without, however, any advantage being derived therefrom.

Any thermosetting silicone resin capable of three-dimensional cross-linking can, in principle, be used in the present invention provided it can be cross-linked at a temperature below the decomposition temperature of the high explosive. The polysiloxanes described in U.S. Pat. Nos. 3,453,156 and 2,949,352 are not suitable because these are essentially thermoplastic mono-dimensional or bi-dimensional macromolecular assemblies. The same is true of the silicone resins used in French Pat. No. 2,109,102.

Resins which are particularly suitable for carrying out the invention are resins obtained by condensation of polysiloxane prepoloymers containing units of the formula:

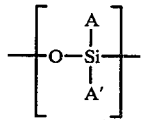

where A and a′ are linear or branched alkyl groups having from 1 to 3 carbon atoms, acyclic alkenyl groups, monocyclic aryl, alkylaryl or aralkyl groups, or polysiloxane chains carrying hydrocarbon substituents, or polysiloxanes of the same type, the ends of the polysiloxane chains being terminated by a reactive or non-reactive hydroxyl group. The polysiloxane prepolymers are preferably heavily branched and have a molecular weight which is preferably from 1,000 to 10,000; the latter feature makes then particularly easy to use. Polysiloxanes having a molecular weight of less than 1,000, for example down to 200, or more than 10,000 can also be used, but such prepolymers generally have either too liquid or too solid a consistency, particularly if the degree of branching is very high or very low, and this can be a disadvantage from the point of view of manufacture or from the point of view of performance. The degree of branching can be defined by the ratio (Ai/Si), where Si is the number of silicon atoms in the chain and Ai the number of side chains of an alkyl, acyclic alkenyl, monocyclic aryl, aralkyl or alkylaryl type. This ratio is, of course, between 0 and 2 and, the closer to 0, the more the polysiloxane chain is branched, that is to say the silicon atoms of the main polysiloxane chain are substituted by chains containing units of the formula:

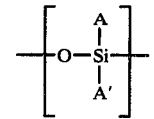

wherein A and A′ have the same meanings as above or, in other words, that it comprises silicon atoms triply or quadruply linked to polysiloxane chains. Polysiloxane prepolymers in which the ratio (Ai/Si) is from 0.9 to 1.8, more preferably from 1.0 to 1.6, are preferably used. According to a preferred embodiment of the invention, the A and A′ substituents are methyl or phenyl groups. In particular, when certain A and A′ groups are phenyl, a preferred polysiloxane contains such a number of these that the ratio of the number of phenyl groups to the number of silicon atoms is between 0 and 0.9 and preferably 0 and 0.8. Nevertheless, it is possible to exceed these preferred values by varying the factors which prevail during cross-linking, that is to say, in particular, the catalyst content and the cross-linking temperature. The actual polymerisation is a polycondensation between the intermolecular or intramolecular hydroxyl groups.

Prepolymers which contain about 5% of free OH groups can be cross-linked under conditions which are very advantageous industrially, but OH contents of from 0.5 to 5% provide, depending on the nature of the prepolymer and its structure, satisfactory resins.

Suitable cross-linking catalysts include, for example, lead salts of organic fatty acids, such as lead octanoate. The proportion of catalyst to be used is suitably from 0.1 to 10% with respect to the weight of resin and depends on the nature of the prepolymer and, in particular, on the proportion of explosive. The greater the amount of high explosive and other adjuvants mixed with the resin, the higher, in general, should the catalyst content be.

Suitable cross-linking temperatures can be readily determined by those skilled in the art in accordance with the requirements of production and in accordance with the nature of the prepolymer and of the explosive. Cross-linking is preferably carried out at from 60 to 140° C and more preferably from 70° to 120° C. Temperatures outside the broader range stated can be used if necessary in a particular case. Thus, in the case of a very heat-stable explosive, such as hexanitrostilbene, cross-linking can be effected at 200° C. Though this is not essential, the cross-linking can be carried out in several stages, for example at 70° C and then at 120° C. This is especially the case if the composition contains metallic or organo-metallic adjuvants which to a greater or lesser extent inhibit the action of the cross-linking catalyst or if the resin is admixed with a high proportion of explosive and/or is produced from a prepolymer which has a low proportion of free OH groups.

The explosives used in the present invention can be any of the known crystalline explosives having a high rate of detonation. The following may be mentioned, though this list is in no way limitative: pentaerythritol tetranitrate (pentrite), 2,4,6-trinitro-phenylmethylnitramine (tetryl), cyclotrimethylenetrinitramine (hexogen or RDX), cyclotetramethylenetetranitramine (octogen or HMK), trinitro derivatives of benzene, nitro derivatives of alkylbenzenes, nitro derivatives of hydroxybenzenes (melinite, cresylite and the like), nitro derivatives of aminobenzenes, nitro derivatives of chlorobenzenes, nitro derivatives of naphthalene, nitramines other than those mentioned above, such as nitroguandine or ethylenedinitramine (EDNA), explosives known for their heat stability, such as hexanitrostilbene (HNS), hexanitrodiphenylamine (hexyl), hexanitrodiphenylsulphone, hexanitrodiphenyl, diaminotrinitrobenzene (DATNB), triaminotrinitrobenzene (TATNB), tetranitrodibenzotetraazapentalene (TACOT), and dinitroglycoluril. It is necessary to take into account the heat stability of the explosive to be coated and to use it with a resin which can be cross-linked at a compatible temperature. The explosive can have any of the particle sizes customarily employed in moulded composite explosives and mixtures of two or more crystalline high explosives of the same or different particle sizes can be used.

In addition to the high explosive, various conventional adjuvants for compression-moulded compositions which modify the physical, mechanical and/or detonating properties of the composite explosive, can be incorporated. Thus, for example, a metal powder (such as aluminium, magnesium, tungsten or zirconium) or graphite powder may be added; graphite reduces the shock sensitivity of the moulding powders obtained before compression. The proportion of adjuvant can be as much as 80% of the weight of the composite, particularly when the adjvant is a dense metal powder.

The proportion of resin in the composition may be as low as 2%, but can also be as high as 15% by weight. The best properties are obtained with resin contents of from 4 to 7%.

The composite explosives according to the invention represent a considerable advance over the explosives known hitherto because of their remarkable mechanical strength at elevated temperatures. Values of crushing resistance (or compressive strength) of 300–400 bars at room temperature, of about 200 bars at 100° C, of about 100 bars at 150° C, and of about 90 bars at 250° C are frequently achieved with compositions according to the invention which, in addition, have very high rates of detonation, close to those of the corresponding pure high explosives.

By way of comparison, a composite explosive containing 90% of hexogen and 10% of polyvinyl acetate (that is, a thermoplastic binder), has a crushing resistance of 600 bars at 20° C, of 150 bars at 50° C, of 45 bars at 80° C, of 25 bars at 110° C, and of only 10 bars at 140° C.

In order that the invention may be more fully understood, the following examples are given by way of illustration only:

EXAMPLE 1

600 ml of water, 231.25 g of crude hexogen and 1.25 g of graphite were introduced into a glass reactor having a useful capacity of 1 liter. The solids were dispersed by agitation with a 4 paddle stirrer rotating at 500 rpm.

A solution of 18.75 g of a polysiloxane prepolymer having a molecular weight of 2,000, an Ai/Si ratio of 1.25 and containing an average of 0.625 phenyl group per silicon atom, in 50 ml of toluene was prepared. 0.375 g of lead octanoate (containing 25% of metal) was added to this solution and the mixture obtained was introduced into the reactor, the temperature of which had been raised to 75° C.

At this temperature, the toluene was distilled off under a reduced pressure of 460 mm of mercury, after which the reactor was cooled by circulation of cold water over its external surface, and its contents were poured on to a filter. The filtered product was suction-drained and then dried in an oven at 70° C for 15 hours.

The degree of polymerisation was 75 to 85% as shown by extraction of the non-polymerised resin.

The moulding powder obtained had a uniform particle size which was between 1.5 and 0.3 mm. The coefficients of sensitivity to shock and to friction of this powder were respectively 0.65 kg and 21.4 kgf, as measured with Julius Peters apparatuses.

The degree of polymerisation could be increased to 90–93% by additional heating for several hours at 130° C.

The moulding powder was compressed at ambient temperature, 20° C, under a pressure of 2,460 bars to give cylindrical pellets of 14 mm diameter and 10 mm thickness. The pellets contained 92% of hexogen and 8% of binder. The density of the mouldings obtained was 1.67 g/cm$^3$ as against 1.82 g/cm$^3$ for pure hexogen. The detonation rate was 8,100 m/second. The mechanical compressive strength of the pellets was 350 bars at ambient temperature and 160 bars at 100° C.

A stability test in vacuo showed an evolution of gas of 0.3 cm$^3$ per gram of product after 100 hours at 130° C.

EXAMPLE 2

The procedure of Example 1 was repeated, but using 2% of graphite (instead of 0.5%). The coefficient of sensitivity to shock of the product was in this case 0.95 kgm and the coefficient of sensitivity to friction was 21.9 kgf.

EXAMPLE 3

The constituents described in Example 1 were used but the process was slightly modified.

The resin and the lead octanoate were dissolved in 75 ml of acetone at ambient temperature. This solution was poured slowly (over the course of 15 minutes) into the aqueous suspension of explosive and graphite, which was also at ambient temperature.

The degree of polymerisation had reached 83% after drying for 15 hours at 70° C; it was possible to increase this to 93% by heating for one hour at 130° C.

The properties of the product obtained were similar to those of the product obtained in Example 1.

EXAMPLE 4

The preparation of the moulding powder was similar to that of Example 1, but the following amounts of ingredients, by weight, were used: 65% of hexogen recrystallised from cyclohexanone, 30% of passivated aluminum (of particle size such that 35% passed through a 40 μ sieve), 5% of the polysiloxane prepolymer of Example 1, and 0.1% of lead octanoate.

The powder was dried for 15 hours at 70° C. A powder of uniform particle size, having a sensitivity to shock of 0.31 kgm and a sensitivity to friction of 18.6 kgf, was obtained.

The powder obtained after normal drying was polymerised to the extent of 40%, since the aluminum inhibited the catalytic action of the lead salt. The powder was therefore re-heated at 130° C and the degree of polymerisation was 70% after 1 hour and 82% after 4 hours.

The dried and cross-linked powder was compressed at ambient temperature, 18° C, under 3,280 bars. Pellets of dimensions identical to those of Example 1, having a density of 1.89 g/cm³ and a rate of detonation of 7,800 m/second were obtained. The mechanical resistance to crushing was 300 bars at 18° C and 90 bars at 150° C.

In the vacuum stability test, an evolution of gas of 0.5 cm³ per gram of product was observed after 100 hours at 130° C.

EXAMPLE 5

A composition containing 95.5% of hexanitrostilbene, 0.5% of graphite, 4.0% of the same silicone resin as in Examples 1 and 4, and 0.08% of lead octanoate was prepared in the same way as in Example 1.

The moulding powder had an acceptable granulometry: its sensitivity to shock was 0.81 kgm and its sensitivity to friction 28.6 kgf. The degree of polymerisation was 90% after re-heating for 4 hours at 130° C. The powder was remarkably stable up to 260° C, and the evolution of gas was 3.5 cm³/g after 10 hours at this temperature.

The powder was moulded under a pressure of 3,000 bars at ambient temperature, 18° C. Pellets having a density of 1.65 g/cm³ and a rate of detonation of 6,800 m/second were obtained.

The mechanical strength of the pellets was 110 bars at 18° C and was substantially constant up to 250° C, where it was still as high as 85 bars.

EXAMPLE 6

The procedure of Example 1 was repeated with the following constituents, parts by weight:

| | |
|---|---|
| Octogen CHN | 96 |
| Resin (as in Example 1) | 3 |
| Graphite | 1 |
| Lead octoate | 0.06 |

Drying of the filtered powder was carried out at 70° C for 15 hours and the powder was then heated for 1 hour at 130° C. At that stage, the explosive had the following characteristics:

| | |
|---|---|
| Degree of polymerisation | 86% |
| Coefficient of sensitivity to shock: | 0.42 kgm |
| Coefficient of sensitivity to friction: | 12.4 kgf. |

The powder was then compressed under 3,280 bars and an explosive having the following characteristics was obtained:

| | |
|---|---|
| Density: | 1.83 |
| Mechanical resistance to crushing: | 140 bars at ambient temperature |
| Rate of detonation: | 8,650 m/sec. |
| Stability in vacuo for 100 hours at 130° C: | 0.23 cm³/g. |

EXAMPLE 7

The procedure of Example 1 was repeated with the following constituents, parts by weight:

| | |
|---|---|
| Octogen CHN | 92.5 |
| REsin (as in Example 1) | 7.5 |
| Graphite | 0.5 |
| Lead octoate | 0.15 |

Drying of the powder was carried out at 70° C for 15 hours and the powder was then heated for 1 hour at 130° C. At this stage, an explosive having the following characteristics was obtained:

| | |
|---|---|
| Degree of polymerisation: | 90% |
| Coefficient of sensitivity to shock: | 0.43 kgm |
| Coefficient of sensitivity to friction: | 14.3 kgf. |

The powder was then compressed under 2,460 bars and an explosive having the following characteristics was obtained:

| | |
|---|---|
| Density: | 1.75 |
| Mechanical resistance to crushing: | 120 bars at ambient temperature |
| Rate of detonation: | 8,350 m/sec. |
| Stability in vacuo for 100 hours at 130° C: | 0.31 cm³/g. |

EXAMPLE 8

A polysiloxane resin having the following characteristics was used:

| | |
|---|---|
| Molecular weight, approx. | 2,000 |
| Ai/Si | 1.05 |
| Phenyl/Si = | 0.47 |
| OH content, approx. | 5% |

The procedure described in Example 1 was repeated with the following constitutents, parts by weight:

| | |
|---|---|
| Hexogen B St | 92.5 |
| Resin | 7.5 |
| Graphite | 0.5 |
| Lead octoate | 0.15 |

Drying was carried out at 70° C for 15 hours and the moulding powder was then heated for 1 hour at 130° C. At this stage, an explosive having the following characteristics was obtained:

| | |
|---|---|
| Degree of polymerisation reached: | 88% |
| Coefficient of sensitivity to shock: | 0.64 kgm |
| Coefficient of sensitivity to friction: | 22.8 kgf. |

The powder was then compressed under 3,280 bars and an explosive having the following characteristics was obtained:

| | |
|---|---|
| Density: | 1.66 |
| Mechanical resistance to crushing: | 220 bars at ambient temperature |
| Rate of detonation: | 8,050 m/sec. |
| Stability in vacuo for 100 hours at 130° C: | 0.26 cm³g. |

EXAMPLE 9

A silicone resin having the following characteristics was used:

| | |
|---|---|
| Molecular weight, approx. | 2,000 |
| Ai/Si | 1.7 |
| Phenyl/Si = | 0.8 |
| OH content, approx. | 3.5% |

This resin was less cross-linked than those used in the preceding examples

The procedure of Example 6 was employed, using the following constituents, parts by weight:

| | |
|---|---|
| Hexogen | 95 |
| Resin | 5 |
| Graphite | 0.5 |
| Lead octoate | 0.2 |

The resin was added to the aqueous dispersion as an 80% solution in toluene. Drying of the powder was carried out at 70° C for 15 hours and the powder was then heated for 1 hour at 130° C. At that stage, the explosive had the following characteristics:

| | |
|---|---|
| Degree of polymerisation reached: | 92% |
| Coefficient of sensitivity to shock: | 0.42 kgm |
| Coefficient of sensitivity to friction: | 30.8 kgf. |

The material was then compressed under 1,640 bars and an explosive having the following characteristics was obtained:

| | |
|---|---|
| Density: | 1.65 |
| Mechanical resistance to crushing: | 60 bars at ambient temperature |
| Rate of Detonation: | 8,000 m/sec. |
| Stability in vacuo for 100 hours at 100° C: | 0.23 cm³/g. |

What is claimed is:

1. A process for the production of a heat-stable composite explosive, which comprises the steps of
   (i) coating at least one crystalline explosive powder having a high rate of detonation, in the presence of water, with a mixture of a prepolymer of a thermosetting silicone resin and a cross-linking catalyst therefor, whereby coated moulding powder is obtained,
   (ii) drying and cross-linking the coated molding powder, and
   (iii) cold compressing the cross-linked molding powder to form a shaped composite explosive.

2. A process as set forth in claim 1, wherein said prepolymer is a polysiloxane containing units of the formula:

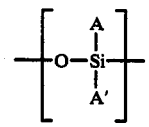

where A and A' are selected from the group consisting of linear or branched alkyl groups having from 1 to 3 carbon atoms, acyclic alkenyl groups, monocyclic aryl, aralkyl or alkylaryl groups, or polysiloxane chains containing units of the formula:

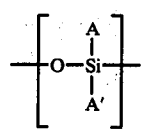

where A and A' have the stated meanings, the polysiloxane chains being terminated by hydroxyl groups and the ratio of the number of hydrocarbon substutitents to the number of silicon atom being from 0.9 to 1.8.

3. A process as set forth in claim 2, wherein said polysiloxane prepolymer has a molecular weight of from 200 to 10000.

4. A process as set forth in claim 2, wherein said polysiloxane prepolymer is one in which the ratio of the number of hydrocarbon substituents to the number of silicon atoms is from 1.0 to 1.6.

5. A process as set forth in claim 2, wherein at least one of A and A' is phenyl and the ratio of the number of phenyl groups to the number of silicon atoms is less than 0.9.

6. A process as set forth in claim 2, wherein the hydroxyl content of said prepolymer is from 0.5 to 5%.

7. A process as set forth in claim 1, wherein said composite explosive comprises at least 2% by weight of said silicone resin and up to 98% by weight of said explosive.

8. A process as set forth in claim 1, wherein said composite explosive comprises from 4 to 7% by weight of said silicone resin.

9. A process as set forth in claim 1, wherein the amount of catalyst used is from 0.1 to 10%, based on the weight of said silicone resin.

10. A process as set forth in claim 1, wherein step (ii) is effected at a temperature of from 60° to 200° C.

11. A process as set forth in claim 1, wherein step (ii) is effected at a temperature of from 70° to 120° C.

12. A process as set forth in claim 1, wherein cold compression is effected at a pressure of at least 1,000 bars.

13. A cross-linked molded powder obtained at the end of step (ii) of the process claimed in claim 1.

14. A heat stable composite explosive prepared by the process of claim 1.

15. A heat-stable pressure-molded composite explosive which comprises at least one crystalline explosive having a high rate of detonation and, as a synthetic binder therefor, a cross-linked silicone resin, which is derived from a polysiloxane containing units of the formula:

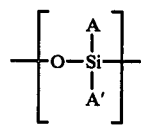

wherein A and A' are selected from the group consisting of linear or branched alkyl groups having from 1 to 3 carbon atoms, acyclic alkenyl groups, or monocyclic aryl, aralkyl or alkylaryl groups, or polysiloxane chains containing units of the formula:

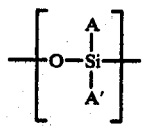

where A and A' have the stated meanings, the polysiloxane chains being terminated by hydroxyl groups and the ratio of the number of hydrocarbon substitutents to the number of silicon atoms being from 0.9 to 1.8.

16. A composite explosive as set forth in claim 15, wherein said polysiloxane is one in which the number of hydrocarbon substituents to the number of silicon atoms is from 1.0 to 1.6.

17. A composite explosive as set forth in claim 15, wherein at least one of A and A' is phenyl and the ratio of the number of phenyl groups to the number of silicon atoms is less than 0.9.

18. A composite explosive as set forth in claim 15, which comprises up to 98% by weight of said explosive and at least 2% by weight of said cross-linked silicone resin.

19. A composite explosive as set forth in claim 15, which comprises from 4 to 7% by weight of said cross-linked silicone resin.

20. An explosive charge comprising a heat-stable molded composite explosive as set forth in claim 15.

* * * * *